(12) United States Patent
Oto et al.

(10) Patent No.: US 9,942,569 B2
(45) Date of Patent: Apr. 10, 2018

(54) IMAGE ENCODING APPARATUS AND CONTROL METHOD OF THE SAME

(71) Applicant: CANON KABUSHIKI KAISHA, Tokyo (JP)

(72) Inventors: Hiroshi Oto, Kawasaki (JP); Masaki Kitago, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/138,585

(22) Filed: Apr. 26, 2016

(65) Prior Publication Data

US 2016/0323602 A1 Nov. 3, 2016

(30) Foreign Application Priority Data

Apr. 28, 2015 (JP) .................................. 2015-092369

(51) Int. Cl.
*G06K 9/46* (2006.01)
*H04N 19/63* (2014.01)
*H04N 19/91* (2014.01)
*H04N 19/61* (2014.01)

(52) U.S. Cl.
CPC ............. *H04N 19/63* (2014.11); *H04N 19/61* (2014.11); *H04N 19/91* (2014.11)

(58) Field of Classification Search
CPC ........ H04N 19/63; H04N 19/61; H04N 19/91; H04N 7/50; H04N 7/26244; H04N 7/26015; H04N 7/34; G06T 9/004
USPC ......................... 382/232, 238, 248, 275, 276
See application file for complete search history.

(56) References Cited

U.S. PATENT DOCUMENTS

| 6,272,180 B1 * | 8/2001 | Lei ......................... H04N 19/63 375/240.16 |
| 6,711,295 B2 * | 3/2004 | Nakayama .............. H03M 7/46 375/240.16 |
| 7,738,119 B2 * | 6/2010 | Tsuru ................. G01B 11/0641 356/237.4 |
| 7,783,119 B2 | 8/2010 | Kajiwara |

(Continued)

FOREIGN PATENT DOCUMENTS

| JP | 4732203 B2 | 7/2011 |
| JP | 5218318 B2 | 6/2013 |

*Primary Examiner* — Sheela C Chawan
(74) *Attorney, Agent, or Firm* — Rossi, Kimms & McDowell LLP

(57) ABSTRACT

An encoding apparatus includes a transformer which performs wavelet transform on image data to generate coefficients of subbands, and a predictive encoder which performs predictive coding on the coefficients. The predictive encoder includes a symbol generator which generates a symbol as an encoding target from a predictive error, an encoder which performs entropy coding on the generated symbol using a parameter determined in a process of encoding an immediately preceding coefficient of the coefficient of interest, an estimation unit which estimates a tentative symbol corresponding to a succeeding coefficient to be encoded next to the coefficient of interest, and a determination unit which determines a parameter for the succeeding coefficient from a code length obtained when assuming that the tentative symbol estimated by the estimation unit is obtained by encoding a parameter used when encoding the symbol of the coefficient of interest.

11 Claims, 13 Drawing Sheets

(56) References Cited

U.S. PATENT DOCUMENTS

| | | | | |
|---|---|---|---|---|
| 8,086,465 B2 * | 12/2011 | Malvar | ............... | G10L 19/0212 |
| | | | | 704/201 |
| 8,897,359 B2 * | 11/2014 | Regunathan | ......... | H04N 19/197 |
| | | | | 375/240.02 |
| 9,037,454 B2 * | 5/2015 | Yoon | ................... | G10L 19/0212 |
| | | | | 704/203 |

* cited by examiner

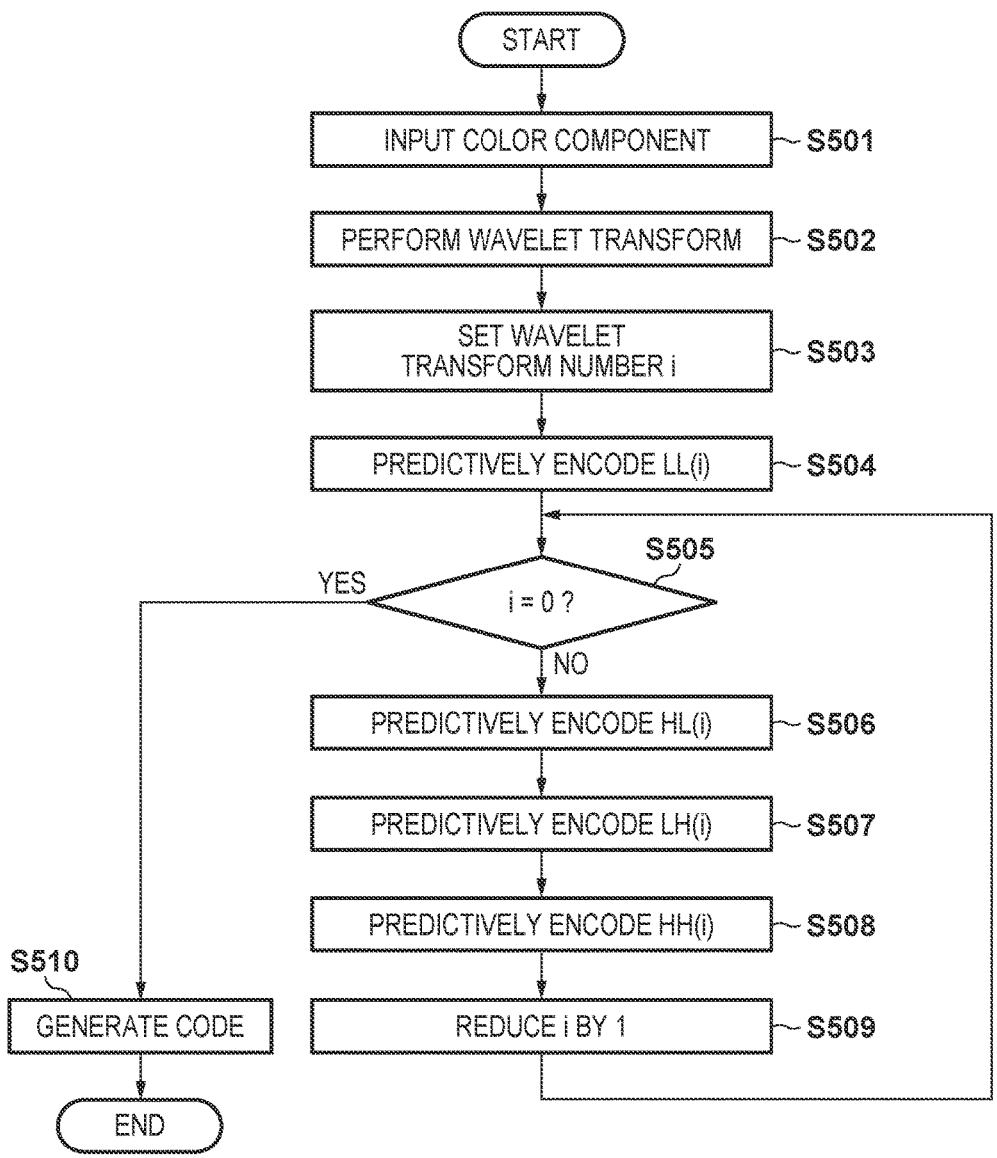

FIG. 9

| SUBBAND COMPONENT | RANGE OF REFERENCE COEFFICIENTS | NUMBER OF NECESSARY WAVELET COEFFICIENTS |
|---|---|---|
| LL | REFERENCE COEFFICIENT / COEFFICIENT OF INTEREST | SUBBAND WIDTH +1 |
| HL | REFERENCE COEFFICIENT / COEFFICIENT OF INTEREST | SUBBAND WIDTH |
| LH | REFERENCE COEFFICIENT / COEFFICIENT OF INTEREST | 1 |
| HH | COEFFICIENT OF INTEREST | 0 |

FIG. 10A

RELATIONSHIP BETWEEN S, K AND CODEWORD

| S \ K | 0 | 1 | 2 | ... |
|---|---|---|---|---|
| 0 | 1 | 10 | 100 | ... |
| 1 | 01 | 11 | 101 | ... |
| 2 | 001 | 010 | 110 | ... |
| 3 | 0001 | 011 | 111 | ... |
| 4 | 00001 | 0010 | 0100 | ... |
| ⋮ | ⋮ | ⋮ | ⋮ | ⋱ |

FIG. 10B

RELATIONSHIP BETWEEN S, K AND CODE LENGTH

| S \ K | 0 | 1 | 2 | 3 | 4 | 5 | ... |
|---|---|---|---|---|---|---|---|
| 0 | 1 | 2 | 3 | 4 | 5 | 6 | ... |
| 1 | 2 | 2 | 3 | 4 | 5 | 6 | ... |
| 2 | 3 | 3 | 3 | 4 | 5 | 6 | ... |
| 3 | 4 | 3 | 3 | 4 | 5 | 6 | ... |
| 4 | 5 | 4 | 4 | 4 | 5 | 6 | ... |
| 5 | 6 | 4 | 4 | 4 | 5 | 6 | ... |
| 6 | 7 | 5 | 4 | 4 | 5 | 6 | ... |
| 7 | 8 | 5 | 4 | 4 | 5 | 6 | ... |
| 8 | 9 | 6 | 5 | 5 | 5 | 6 | ... |
| 9 | 10 | 6 | 5 | 5 | 5 | 6 | ... |
| 10 | 11 | 7 | 5 | 5 | 5 | 6 | ... |
| 11 | 12 | 7 | 5 | 5 | 5 | 6 | ... |
| 12 | 13 | 8 | 6 | 5 | 5 | 6 | ... |
| 13 | 14 | 8 | 6 | 5 | 5 | 6 | ... |
| 14 | 15 | 9 | 6 | 5 | 5 | 6 | ... |
| ⋮ | ⋮ | ⋮ | ⋮ | ⋮ | ⋮ | ⋮ | ⋱ |

FIG. 13
| SUBBAND COMPONENT | POSITIONAL RELATIONSHIP BETWEEN K PARAMETER TO BE USED NEXT AND PAST K PARAMETER TO BE REFERRED | NUMBER OF HELD PARAMETERS (PARAMETER TO BE USED NEXT + PAST K PARAMETER TO BE REFERRED) |
|---|---|---|
| LL | 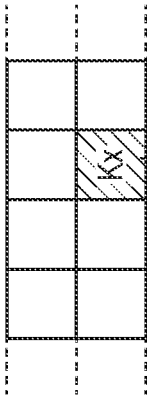 K PARAMETER TO BE USED NEXT (Kx) | 1 |
| HL, LH, HH | 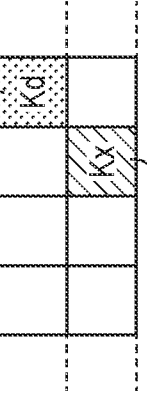 PAST K PARAMETER TO BE REFERRED (Kd), K PARAMETER TO BE USED NEXT (Kx) | SUBBAND WIDTH |

FIG. 14

| SUBBAND COMPONENT | RANGE OF REFERENCE COEFFICIENTS | NUMBER OF NECESSARY WAVELET COEFFICIENTS |
|---|---|---|
| LL | REFERENCE COEFFICIENT (c, b, a) / COEFFICIENT OF INTEREST | SUBBAND WIDTH +1 |
| HL, LH, HH | COEFFICIENT OF INTEREST | 0 |

IMAGE ENCODING APPARATUS AND CONTROL METHOD OF THE SAME

BACKGROUND OF THE INVENTION

Field of the Invention

The present invention relates to an image data encoding technique.

Description of the Related Art

JPEG-LS is an image data encoding method. JPEG-LS can select lossless coding and near-lossless coding. Also, JPEG-LS realizes a high compression ratio by switching predictive coding and runlength coding based on the states of surrounding pixels of an encoding target pixel. In predictive coding, the pixel value of an encoding target pixel is predicted from surrounding pixels, and a predictive error is encoded by Golomb-Rice coding. There is also a known method by which after Golomb-Rice coding is performed, whether the used encoding parameter is appropriate is evaluated, and an encoding parameter to be used next is determined (updated) (for example, Japanese Patent No. 4732203 to be referred to as literature 1 hereinafter).

A coding method which uses a coding method such as JPEG-LS as a coefficient of wavelet transform is also available. A method of determining an encoding parameter by using the correlation between subband components generated by wavelet transform and the correlation between surrounding wavelet coefficients is also known (for example, Japanese Patent No. 5218318 to be referred to as literature 2 hereinafter).

Assume that a coefficient value obtained by converting the frequency of image data is input, the coefficient value of an encoding target coefficient is predicted from surrounding coefficients, and a predictive error is encoded by entropy coding. When determining an encoding parameter of a predictive error as an encoding target, the method of literature 1 evaluates the encoding parameter by using only the code length of a most recently generated code. Therefore, the accuracy of update becomes insufficient if state separation is not properly performed. The method of literature 2 requires a one-line coefficient buffer for each subband component, and hence increases the memory cost.

SUMMARY OF THE INVENTION

The present invention has been made in consideration of the above problem. According to an aspect of the invention, there is provided an image encoding apparatus for encoding image data, comprising: a transformer configured to perform wavelet transform on image data as an encoding target, thereby generating coefficients of a plurality of subbands; and a predictive encoder configured to perform predictive coding on the coefficients in a raster scan order for each of the subbands obtained by the transformer, wherein the predictive encoder comprises: a symbol generator configured to obtain a predictive value corresponding to a coefficient of interest in a subband of interest from a coefficient in a completely encoded position around the coefficient of interest, and generate a symbol as an encoding target from a predictive error as a difference between a value of the coefficient of interest and the predictive value; an encoder configured to perform entropy coding on the generated symbol by using a parameter determined in a process of encoding an immediately preceding coefficient of the coefficient of interest; an estimation unit configured to estimate a tentative symbol corresponding to a succeeding coefficient to be encoded next to the coefficient of interest, based on a symbol corresponding to the coefficient of interest; and a determination unit configured to determine a parameter for the succeeding coefficient from a code length obtained when assuming that the tentative symbol estimated by the estimation unit is obtained by encoding a parameter used when encoding the symbol of the coefficient of interest.

The present invention makes it possible to execute an efficient image encoding process while suppressing the memory cost.

Further features of the present invention will become apparent from the following description of exemplary embodiments (with reference to the attached drawings).

BRIEF DESCRIPTION OF THE DRAWINGS

FIG. 5 is a flowchart of processing performed by the encoder of the first embodiment;

FIG. 9 is a view for explaining the number of coefficients necessary for a prediction process of the first embodiment;

FIGS. 10A and 10B are views for explaining Golomb-Rice coding;

FIG. 13 is a view for explaining the number of necessary K parameters of the K parameter updating process of the first embodiment;

FIG. 14 is a view for explaining the number of coefficients required for a prediction process of the second embodiment.

DESCRIPTION OF THE EMBODIMENTS

Preferred embodiments of the present invention will be explained below with reference to the accompanying drawings. Note that each of the embodiments to be explained below shows an example when the present invention is practically carried out, and is a practical embodiment of an arrangement described in the scope of claims.

[First Embodiment]

The first embodiment is applied to an image encoding apparatus which divides image data into a plurality of subbands by wavelet transform, and encodes wavelet coefficients divided into the subbands by predictive coding. The image encoding apparatus according to the first embodiment will be explained below.

Figure 1:
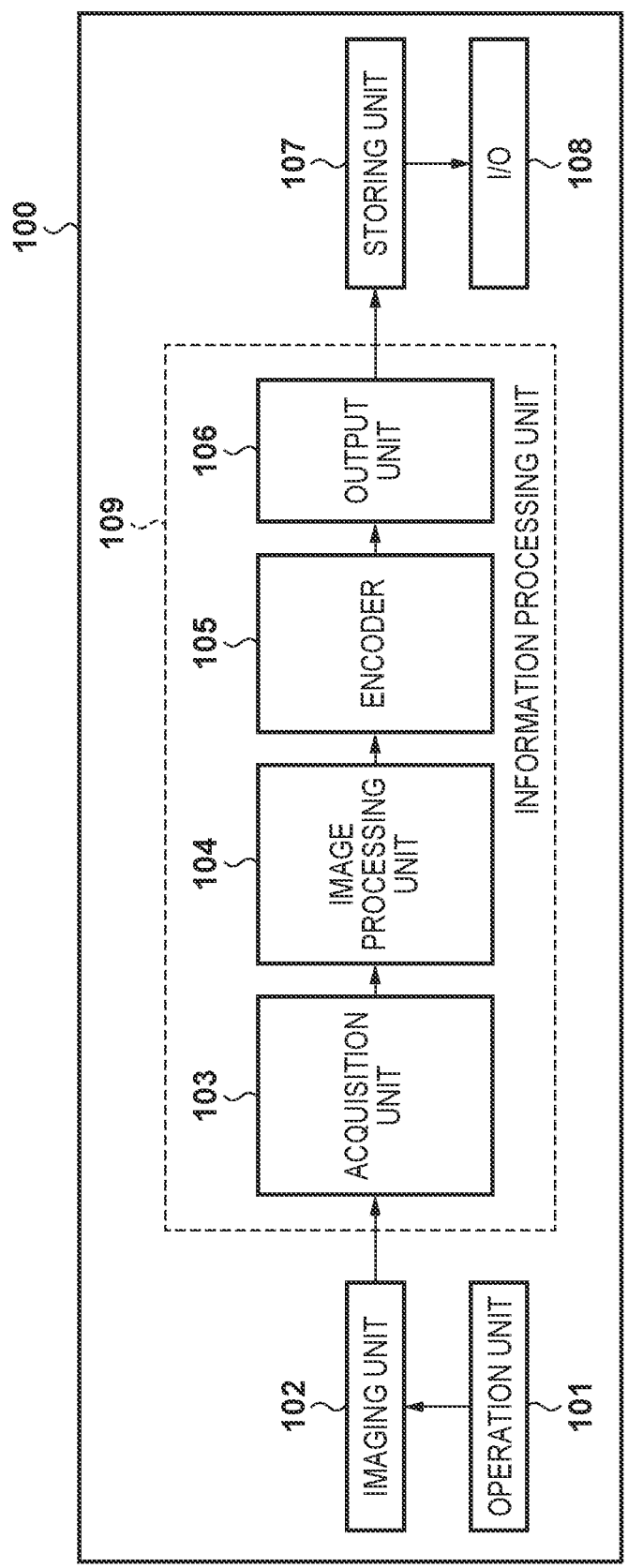
FIG. 1 is a view showing an example of the arrangement of an image encoding apparatus.

FIG. 1 is a block diagram when the image encoding apparatus of the first embodiment is applied to a camera 100.

The camera 100 includes an operation unit 101, imaging unit 102, information processing unit 109, storing unit 107, and I/O interface 108.

Figure 4A:
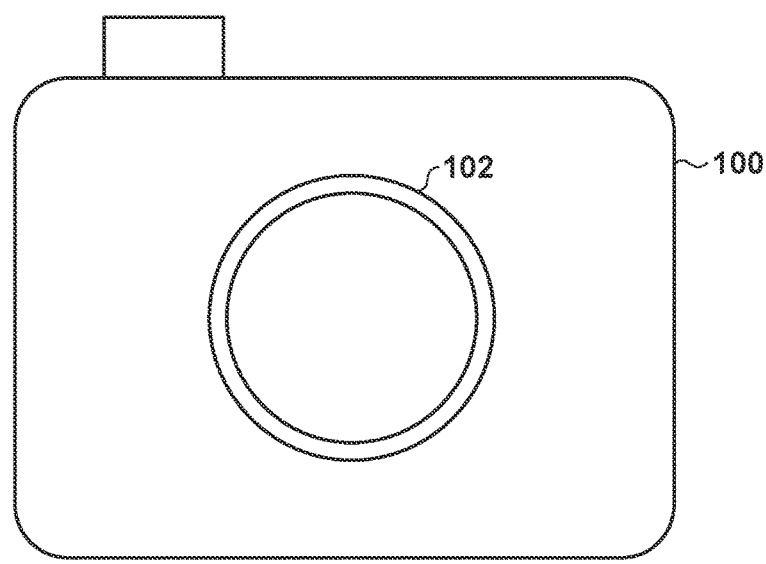
FIGS. 4A and 4B are views showing an example of the arrangement of an imaging unit of a camera.
Figure 4B:
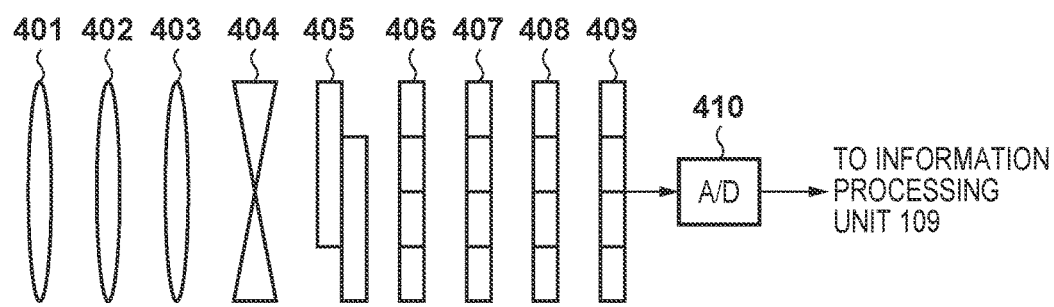

FIG. 4A is a view showing the outer appearance (the front part) of the camera 100. As shown in FIG. 4A, the camera 100 includes the imaging unit 102. FIG. 4B is a view showing the internal arrangement of the imaging unit 102. The imaging unit 102 includes a zoom lens 401, focusing lenses 402 and 403, an aperture stop 404, and a shutter 405. The imaging unit 102 also includes an optical low-pass filter 406, iR cut filter 407, color filter 408, imaging device 409, and A/D converter 410. The user can control an incident light amount to be input to the imaging unit 102 by adjusting the stop 404. The imaging device 409 is a light-receiving device such as a CMOS or CCD. When the imaging device 409 detects the light amount of an object, the A/D converter 410 converts the detected light amount into a digital value. This digital value (digital data) is supplied to the information processing unit 109.

Figure 3:
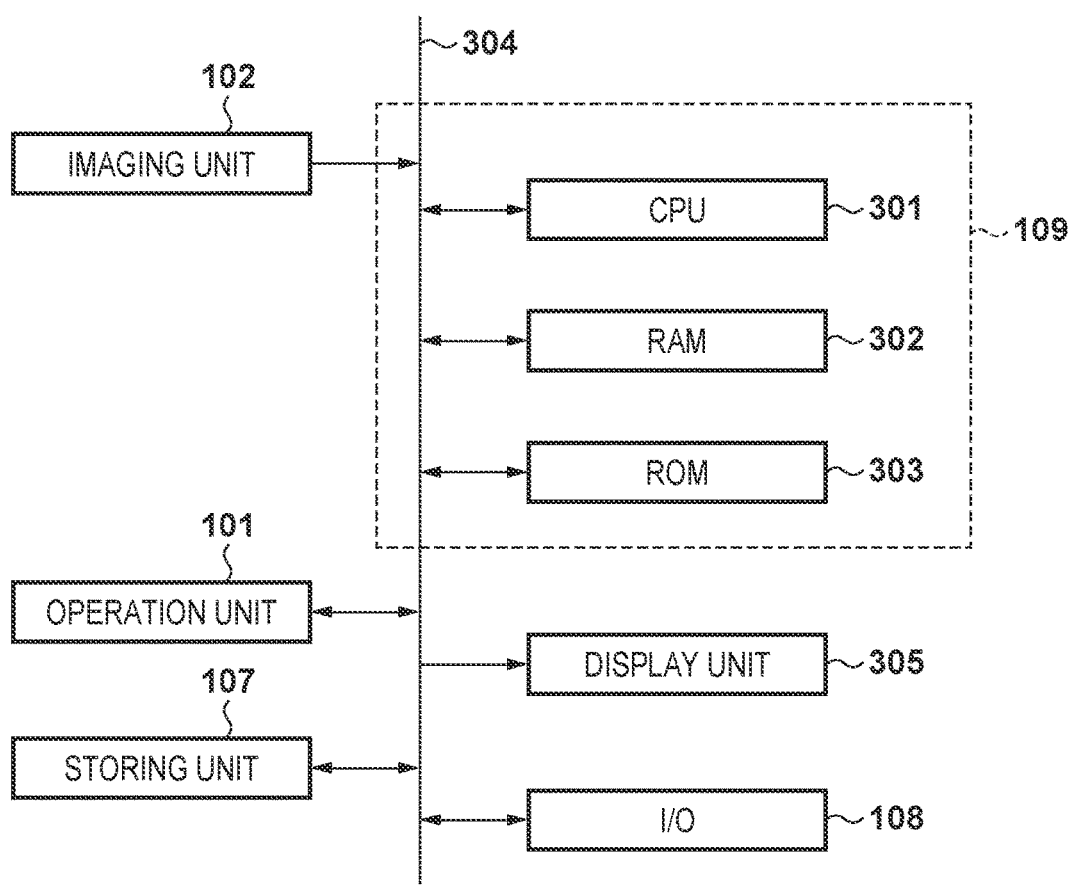
FIG. 3 is a view showing the hardware configuration of an information processing unit.

FIG. 3 is a view showing the internal arrangement of the information processing unit 109. The information processing unit 109 includes a CPU 301, RAM 302, and ROM 303. A system bus 304 connects these components to each other.

The CPU 301 is a processor for comprehensively controlling the individual units in the camera 100. The RAM 302 functions as a main memory, work area, and the like of the CPU 301. The ROM 303 stores programs for executing the individual components of the information processing unit 109 shown in FIG. 1. When the CPU 301 reads out and executes the programs stored in the ROM 303, the information processing unit 109 implements the roles of respective corresponding components shown in FIG. 1. Note that the information processing unit 109 may also include, for example, a dedicated processing circuit which functions as each component shown in FIG. 1, in place of the above arrangement.

The operation unit 101 includes input devices such as a button, dial, and touch panel of the camera body. The user can input instructions such as the start and stop of imaging and the setting of imaging conditions by operating the operation unit 101. The storing unit 107 is a nonvolatile storage medium such as a memory card capable of storing RAW image data acquired by the imaging unit 102 and image data. The I/O interface 108 can use serial bus connection implemented by a universal serial bus (USB), and has a corresponding USB connector. It is, of course, also possible to use, for example, LAN connection by an optical fiber, or wireless connection. A display unit 305 displays images and characters. A liquid crystal display is generally used as the display unit 305. The display unit 305 may also have a touch panel function. In this case, user instructions using the touch panel can be processed as inputs to the operation unit 101.

The processing of the information processing unit 109 of this embodiment will be explained in more detail below. First, an acquisition unit 103 acquires RAW image data output from the imaging unit 102, and supplies the RAW image data to an image processing unit 104. The image processing unit 104 receives the RAW image data, generates image data by de-mosaicking the input data, and outputs the image data to an encoder 105.

The encoder 105 performs entropy coding on the image data. This embodiment will be explained by taking, as an example, a case in which one pixel is expressed by eight bits of each of R, G, and B, and data is encoded as a monochrome image for each color component. That is, the encoder 105 independently encodes an R-component monochrome multilevel image, G-component monochrome multilevel image, and B-component monochrome multilevel image. Note that image data as an encoding target is not limited to RGB image data, and may also be image data using another color space or RAW image data. For example, when one pixel is formed by eight bits of each of Y, Cb, and Cr, this image data can be encoded as a monochrome image for each color component. Also, when this embodiment is applied to RAW image data, the imaging device of the imaging unit 102 has a Bayer array (an array including sets of 2×2 imaging devices corresponding to the colors of R, G0, G1, and B). Assume also that a signal from each imaging device is expressed by 14 bits. In this case, the encoder 105 encodes an R-component monochrome multilevel image, G0-component monochrome multilevel image, G1-component monochrome multilevel image, and B-component monochrome multilevel image. Accordingly, this application is not restricted by the type of color space of an image, the types of color components forming an image, and the number of bits. Note that it is assumed that an image as an encoding target is formed by eight bits (256 gray levels) of each of the three components R, G, and B in order to facilitate understanding by exhibiting a practical example.

Figure 2:
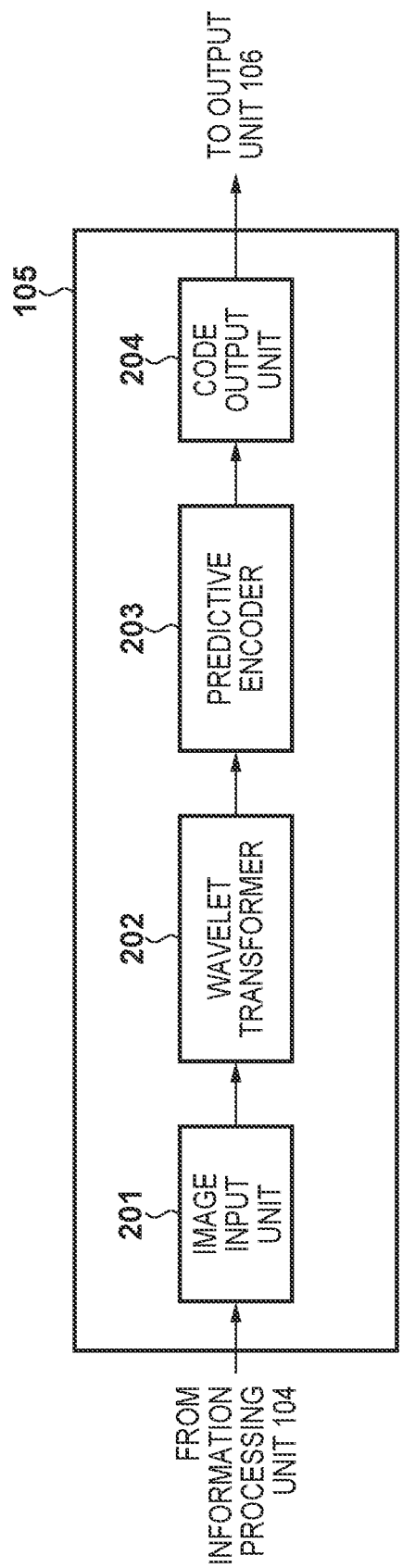
FIG. 2 is a view showing an example of the arrangement of an encoder of the first embodiment.

The processing of the encoder 105 according to this embodiment will be explained. FIG. 2 shows the internal arrangement of the encoder 105. FIG. 5 is a flowchart showing an encoding process to be performed by the encoder 105 on image data of one color component (in this embodiment, one of R, G, and B). That is, this process shown in FIG. 5 is practically executed three times. One file is formed by collecting encoded data obtained by executing the process three times.

An image input unit 201 receives image data of one color component as monochrome multilevel image data from image data output from the image processing unit 104 (step S501).

A wavelet transformer 202 receives the monochrome multilevel image data from the image input unit 201, and performs wavelet transform a preset number of times. As a consequence, the image data is divided into a plurality of decomposition levels. Each decomposition level includes a plurality of subbands. The decomposition level indicates the number of times of division when a low-frequency-component subband (LL) is recursively divided into two in the horizontal and vertical directions. When the number of decomposition levels increases by 1, the horizontal and vertical resolutions reduce by half.

Figure 7A:
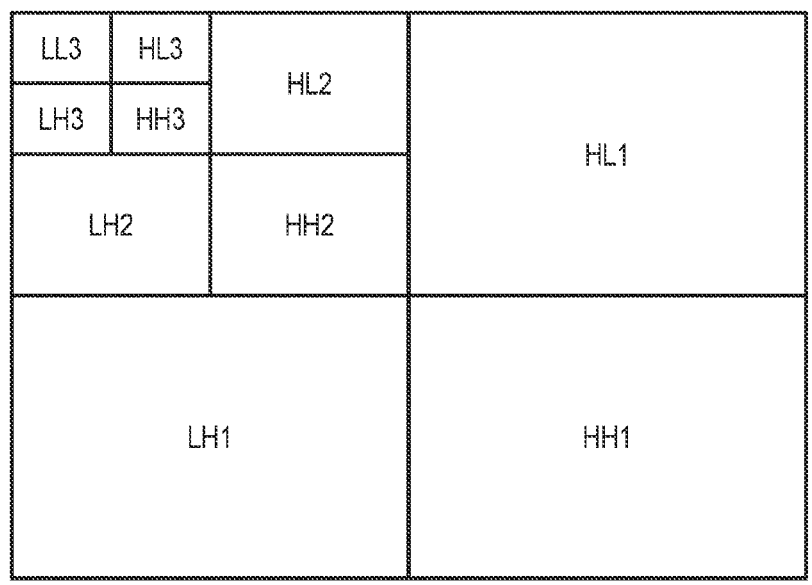
FIGS. 7A and 7B are views for explaining the concept of subband division by wavelet transform, and an example of a code to be generated.

FIG. 7A explains an example in which wavelet transform is executed three times. LL1, HL1, LH1, and HH1 represent the subbands of decomposition level 1, LL2, HL2, LH2, and HH2 represent the subbands of decomposition level 2, and LL3, HL3, LH3, and HH3 represent the subbands of decomposition level 3. Note that a transform target of wavelet transform from the second time is subband LL obtained by immediately preceding wavelet transform, so subbands LL1 and LL2 are omitted, and subband LL obtained by last wavelet transform remains. Also, the horizontal and vertical resolutions of, for example, HL2 are half those of HL1. Subband LH indicates a horizontal-direction frequency characteristic (a horizontal-direction component) of a local region to which wavelet transform is applied. Likewise, subband HL indicates a vertical-direction frequency characteristic (a vertical-direction component), and subband HH indicates an oblique-direction frequency characteristic (an oblique-direction component). Subband LL is a low-frequency component. An integer-type 5/3 filter is used in wavelet transform of this embodiment, but the present invention is not limited to this. It is also possible to use another wavelet transform filter such as a real-type 9/7 filter used in JPEG2000 (ISO/IEC15444|ITU-TT. 800) as an international standard. In addition, the processing unit of wavelet transform can be either a line or image.

The wavelet transformer 202 outputs the wavelet coefficient of each wavelet-transformed subband to a predictive encoder 203 (step S502). The predictive encoder 203 predictively encodes the wavelet coefficient of each subband. Details of the predictive transformer 203 will be described later.

In step S503, the predictive encoder 203 sets a variable i indicating the number of times of decomposition in wavelet transform. In this embodiment, an example in which i=3 is set will be explained. Note that the user can suitably change the number of times of wavelet transform from the operation unit 101. Note also that in the flowchart of FIG. 5, subbands LL(i), HL(i), LH(i), and HH(i) are generalized by using the variable i. For example, HL(3) indicates the same subband as that of HL3 shown in FIG. 9.

In step S504, the predictive encoder 203 executes a process of predictively encoding subband LL3. The predictive encoder 203 stores encoded data obtained by this encoding process in a buffer area pre-allocated in the RAM 302.

In step S505, the predictive encoder 203 determines whether the variable i is 0. Assume that the state in this step is an initial stage, that is, =3. Accordingly, the process advances to step S506.

In step S506, the predictive encoder 203 executes a process of predictively encoding subband HL(3). The predictive encoder 203 stores encoded data obtained by this encoding process in the buffer area pre-allocated in the RAM 302. In step S507, the predictive encoder 203 executes a process of predictively encoding subband LH(3). The predictive encoder 203 stores encoded data obtained by this encoding process in the buffer area pre-allocated in the RAM 302. In step S508, the predictive encoder 203 executes a process of predictively encoding subband HH(3). The predictive encoder 203 stores encoded data obtained by this encoding process in the buffer area pre-allocated in the RAM 302.

After that, the predictive encoder 203 reduces the variable i by 1 in step S509. This results in variable i=2. Then, the predictive encoder 203 returns the process to step S505. Subsequently, the predictive encoder 203 performs the above process until it is determined in step S505 that variable i=0.

If it is determined that variable i=0, the encoded data of a total of ten subbands LL(3), HL(3), LH(3), HH(3), HL(2), . . . , HH(1) are stored in the buffer area of the RAM 302. Therefore, a code output unit 204 generates encoded data of monochrome multilevel image data of a color component of interest by integrating these subband encoded data, and outputs the generated data (step S510).

Figure 7B:
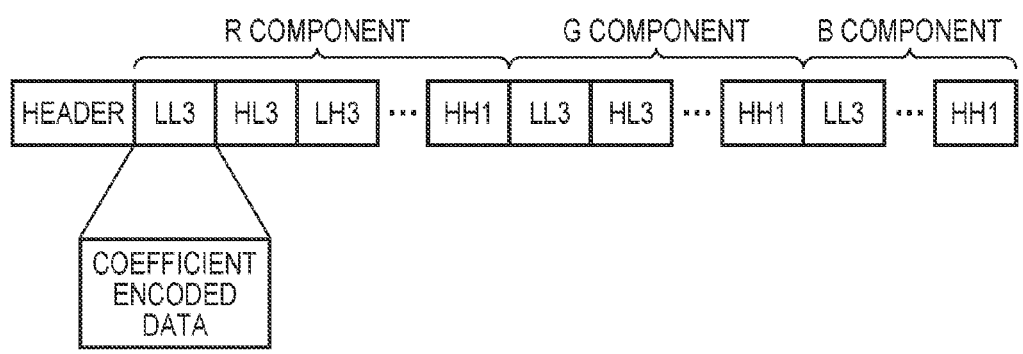

The foregoing is the encoding process for one color component. As described previously, however, this embodiment performs encoding for each of color components R, G, and B. Therefore, the encoder 105 executes the process shown in FIG. 7 three times. Referring to FIG. 1 again, the encoder 105 supplies the encoded data of all the color components to an output unit 106. The output unit 106 forms an image file by adding an appropriate header to the supplied encoded data of the individual components, and outputs the image file as a compressed image data file to the storing unit 107 where the compressed image data file is saved. FIG. 7B shows an example of the data structure of the compressed image data file. The header shown in FIG. 7B contains information necessary for decoding, for example, the size (the number of horizontal-direction pixels and the number of vertical-direction pixels) of the image data as an encoding target, the number of times of wavelet transform, the name of a color space, and the number of bits of a color component.

The overall procedures when dividing image data into subbands by wavelet transform and predictively encoding each subband have been explained above. Next, details of the predictive encoder 203 for predictively encoding the wavelet coefficient of each subband in a raster scan order will be explained.

Figure 6:
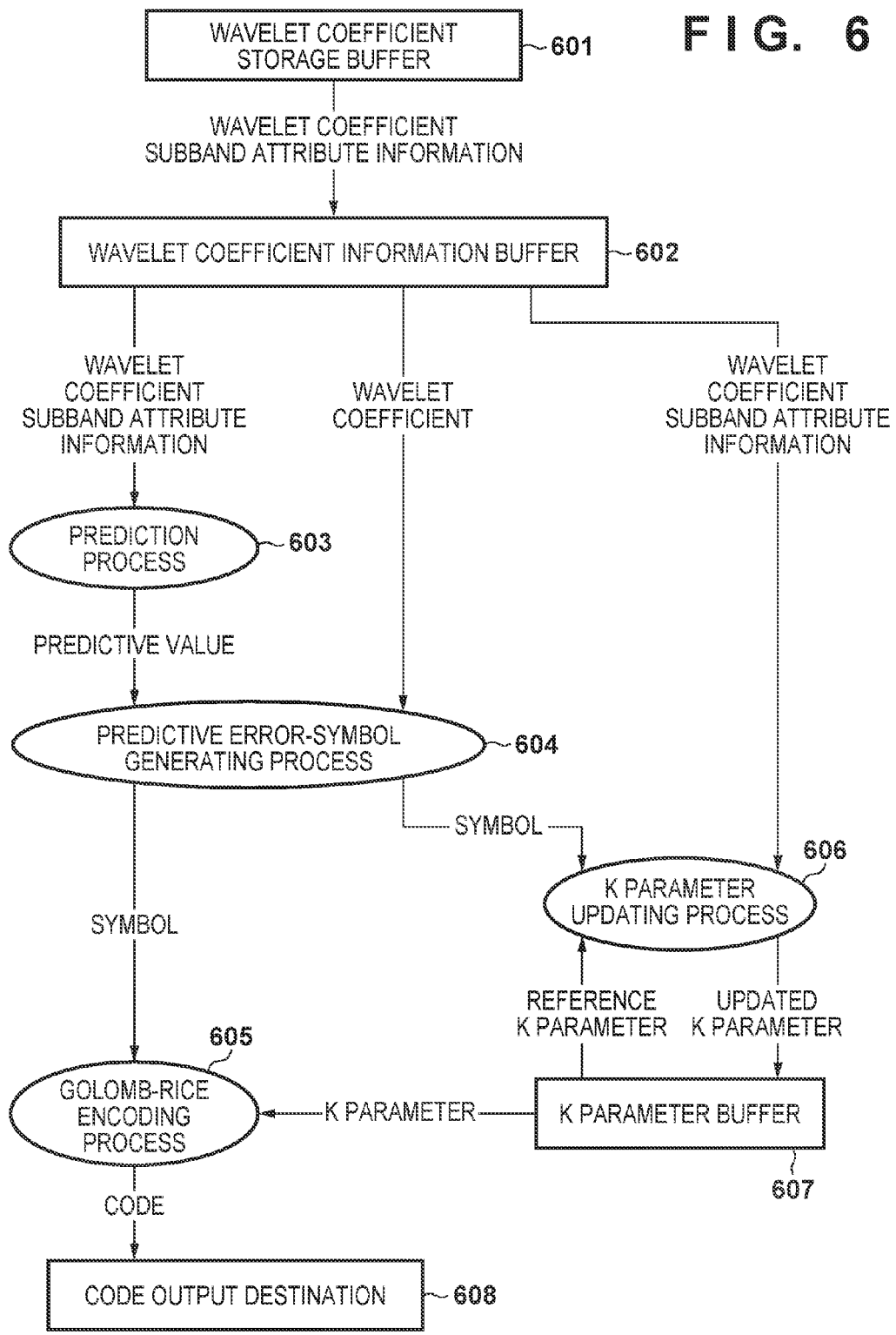
FIG. 6 is a dataflow diagram in a predictive encoder of the first embodiment.

FIG. 6 shows a dataflow diagram of the predictive encoder 203 according to the first embodiment. Note that various buffers shown in FIG. 6 are allocated in the RAM 302.

First, the wavelet coefficients obtained by the wavelet transformer 202 are stored in the raster scan order in a wavelet coefficient storage buffer 601 (allocated in the RAM 302) for each subband. Subband attribute information is also stored in the wavelet coefficient storage buffer 601. "The subband attribute information" contains the subband width, the subband height, and information indicating whether the subband is LL, HL, LH, or HH.

A wavelet coefficient information buffer 602 holds wavelet coefficient information necessary for predictive coding, which is read out from the wavelet coefficient storage buffer 601. The wavelet coefficient information buffer 602 is desirably implemented by a high-speed memory such as an SRAM because accesses frequently occur during encoding. The wavelet coefficient information held in the wavelet coefficient information buffer 602 contains wavelet coefficients necessary for processes 603, 604, and 606 and the above-described subband attribute information. Note that "the necessary wavelet coefficients" will be described in the next paragraph. Note also that the bit range of the wavelet coefficient depends on the bit range of an input image, the number of times of wavelet transform, and the type of wavelet filter. For example, when a 14-bit input image is wavelet-transformed three times by using an integer-type 5/3 filter, the bit range of the generated wavelet coefficient is 20 bits.

The prediction process 603 is a process of predicting the value of a wavelet coefficient of interest. In this embodiment, the prediction process is performed based on the wavelet coefficient stored in the wavelet coefficient information buffer 602, and the subband attribute information. The prediction process 603 will be explained in detail below.

First, the predictive encoder 203 identifies whether the wavelet coefficient of interest as an encoding target belongs to subband LL, HL, LH, or HH from the subband attribute information.

Figure 8:
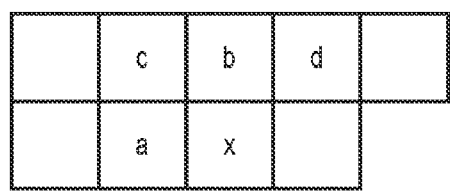
FIG. 8 is a view showing the positional relationship between a coefficient of interest and reference coefficients.

Then, the predictive encoder 203 performs prediction corresponding to the subband. This prediction is performed by referring to wavelet coefficients (to be referred to as reference coefficients hereinafter) existing in already encoded positions around the wavelet coefficient of interest (to be referred to as a coefficient of interest hereinafter) as an encoding target. FIG. 8 shows the positional relationship between the coefficient of interest and reference coefficients in order to explain prediction in each subband. In FIG. 8, reference symbol x denotes the coefficient of interest, and reference symbols a, b, c, and d denote the reference coefficients. Since it is assumed that processing is performed in the raster scan order in the first embodiment, the reference coefficients a, b, c, and d exist in the already encoded positions. Note that the coefficients b and d do not exist if the coefficient x of interest is positioned in the first line of a given subband. Especially when the coefficient x of interest is positioned at the left end of the first line of a given subband, none of the coefficients a to d exist. Furthermore, when the coefficient x of interest is positioned at the left end of the second or subsequent line of a given subband, the coefficients a and c do not exist. Non-existing coefficients like these are each regarded as having a predetermined value. This predetermined value is not particularly limited as long as the value is common to the encoding side and decoding side. Assume that the predetermined value is 0 in this embodiment. A method of predicting each subband will be described below.

When the subband of interest currently being encoded is LL, the predictive encoder 203 obtains a predictive value p of the coefficient by using MED (Median Edge Detection) prediction, thereby performing predictive coding. An expression for calculating the predictive value p by using the reference coefficients shown in FIG. 8 is as follows:

$$p = \begin{cases} \max(a, b) & \text{if } c \leq \min(a, b) \\ \min(a, b) & \text{if } c \geq \max(a, b) \\ a + b - c & \text{otherwise} \end{cases}$$

When the subband currently being processed is HL, the predictive encoder 203 uses vertical prediction. Since subband HL has a vertical frequency characteristic, vertical prediction is effective to improve the encoding efficiency. An expression for calculating the predictive value p by using the coefficients shown in FIG. 8 is as follows:

p=b

When the subband currently being processed is LH, the predictive encoder 203 performs horizontal prediction. Since subband LH has a horizontal frequency characteristic, horizontal prediction is effective to improve the encoding efficiency. An expression for calculating the predictive value p by using the coefficients shown in FIG. 8 is as follows:

p=a

When the subband currently being processed is HH, the predictive encoder 203 performs no prediction and uses a fixed value. A practical predictive value p is as follows:

p=0

By the above processing, the predictive encoder 203 outputs the predictive value p corresponding to the subband to which the wavelet coefficient of interest as an encoding target belongs. When performing the prediction process as described above, the range of necessary reference coefficients changes. The wavelet coefficient information buffer 602 is desirably designed based on the reference coefficient range in this prediction process. For example, the reference coefficients a, b, and c are used in the prediction process when encoding the wavelet coefficient of subband LL. Of the reference coefficients a, b, and c, the reference coefficient c is farthest from the wavelet coefficient x of interest in the array. To refer to coefficients positioned in the coefficient c, it is necessary to hold wavelet coefficients by a number represented by subband width+1. This similarly applies to subbands LH, HL, and HH: the number of wavelet coefficients to be held can be obtained from reference coefficients to be used in prediction. FIG. 9 shows the relationship between reference coefficients to be used in the prediction process of each subband and the number of wavelet coefficients to be held in order to realize the reference.

The predictive encoder 203 then performs the predictive error-symbol generating process 604. In this process, the predictive encoder 203 receives the predictive value p obtained in the prediction process 603, and the wavelet coefficient x of interest from the wavelet coefficient information buffer 602. Subsequently, the predictive encoder 203 obtains a predictive error Diff from the predictive value p and coefficient x of interest, and generates a symbol to be practically encoded. The relationship between the predictive error Diff, coefficient x of interest, and predictive value p is as follows:

Diff=x−p

Then, the predictive encoder 203 converts the predictive error Diff into a non-negative integral value based on the following expression, and determines this value as a symbol S to be encoded:

$$S = \begin{cases} 2 \times \text{Diff} & \text{if Diff} \geq 0 \\ -2 \times \text{Diff} - 1 & \text{otherwise} \end{cases}$$

Consequently, the symbol S is obtained as a non-negative integer, and it is possible to identify the predictive error Diff and whether its sign is plus or minus sign based on whether the symbol S is an even or odd number.

Subsequently, the predictive encoder 203 performs a Golomb-Rice encoding process 605 on the symbol S output from the predictive error-symbol generating process 604 by using a K parameter read out from a K parameter buffer 607. Note that both the symbol S and K parameter are non-negative integers. Note also that the K parameter updating process 606 as a process of updating the K parameter buffer 607 will be described later.

The procedure of Golomb-Rice coding is as follows.

Step 1: 0s equal to a number indicated by a value obtained by shifting the symbol S (binary expression) to the right by K bits are arranged, and binary data is generated by adding 1 after these 0s.

Step 2: Lower K bits of the symbol S are extracted and added after the binary data generated in step 1.

FIG. 10A shows the relationship between the K parameter, the symbol S, and a codeword (binary notation) of Golomb-Rice coding. FIG. 10A demonstrates that when the symbol S is 3 and K=1, for example, a codeword to be generated by Golomb-Rice coding is "011" by binary notation. However, Golomb-Rice coding is not limited to this, and it is also possible to form a code by switching 0 and 1, or by switching steps 1 and 2 described in the aforementioned procedure.

FIG. 10B shows the relationship between the K parameter, the symbol S, and the code length (the number of bits) of a codeword to be generated. For example, the codeword is "011" when the symbol S is 3 and the K parameter is 1 as described above, so the code length is "3 (bits)". As shown in FIG. 10B, the code length (the number of bits) of a codeword to be generated by the K parameter changes when the symbol S is fixed. When symbol S=6, for example, a minimum code length of 4 is obtained when the K parameter is 2 or 3. The code length increases when the K parameter is 1 or less or 4 or more. That is, a K parameter range within which the codeword has the minimum code length exists, and no minimum code length is obtained if a K parameter smaller or larger than this range is used. This similarly applies to symbols other than 6, although there is the condition that the K parameter is a non-negative integer. Note that hatched portions in FIG. 10B indicate regions where no minimum code length is obtained. To achieve a high encoding efficiency, therefore, it is necessary to appropriately determine the K parameter. The K parameter updating process 606 is a process of determining the K parameter, and details of this process will be described below.

The basic processing of the K parameter updating process 606 of the predictive encoder 203 is to update the K parameter used in the Golomb-Rice encoding process 605 for the coefficient x of interest, in order to use the K parameter in Golomb-Rice coding of a coefficient to be encoded next. The K parameter updating process 606 is performed by receiving the wavelet coefficients and subband attribute information from the wavelet coefficient information buffer 602, the symbol S from the predictive error-symbol generating process 604, and the past K parameters to be referred to from the K parameter buffer 607.

The K parameter for the symbol S has an optimum value by which the code length is minimum as described previously, but a symbol as a next encoding target is unknown. Therefore, the gist of the K parameter updating process 606 is to predict a symbol as the next encoding target, and determine a K parameter suitable for the symbol.

Figure 11:
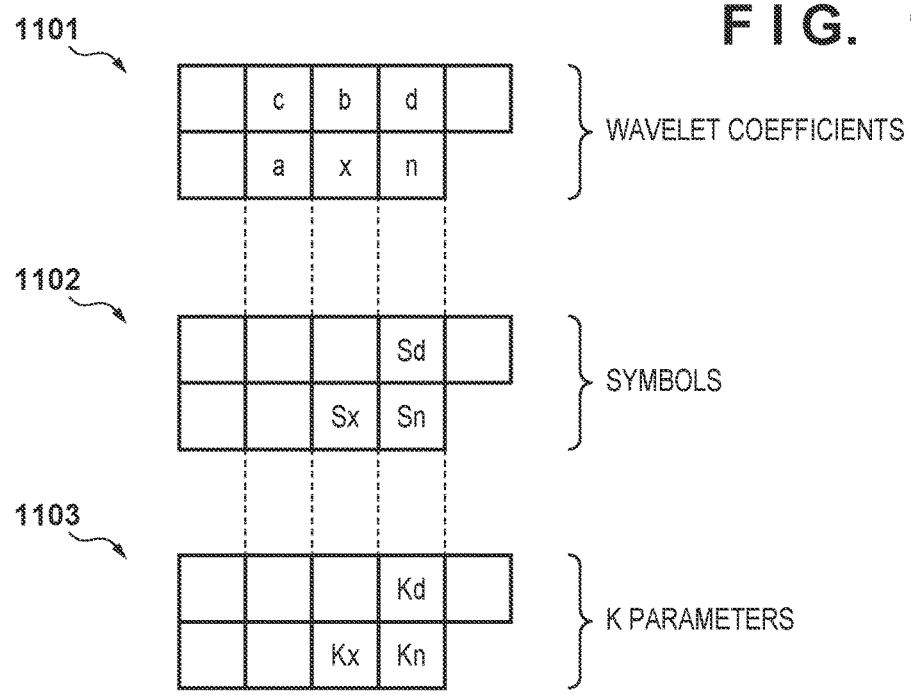
FIG. 11 is a view showing the positional relationship between wavelet coefficients, symbols, and K parameters.

To explain this process, FIG. 11 shows the positional relationship between the wavelet coefficients, symbols, and K parameters to be used in the process.

Referring to FIG. 11, a to d, x, and n denote wavelet coefficients. The wavelet transform coefficient x is a most recently encoded wavelet coefficient. The wavelet transform coefficients a, b, c, and d are encoded coefficients around the wavelet transform coefficient x. The wavelet transform coefficient n indicates a coefficient as a next encoding target, and is unknown immediately after encoding of the coefficient x is complete. Note that the layout of the wavelet transform coefficients a, b, c, d, and x is the same as that shown in FIG. 8, but the wavelet transform coefficient x shown in FIG. 11 is a coefficient of interest having undergone the encoding process.

Sx, Sd, and Sn in FIG. 11 denote symbols corresponding to the wavelet coefficients. The symbol Sx is a symbol corresponding to the most recently encoded wavelet coefficient x, and is an actually encoded symbol S received from the symbol generating process 604. The symbol Sn is a symbol of the coefficient n as a next encoding target, and is also a target to be predicted in this process. The symbol Sd is a symbol used when encoding the wavelet coefficient d.

Kx, Kd, and Kn in FIG. 11 denote K parameters corresponding to the wavelet coefficients. Kx is a K parameter corresponding to the most recently encoded wavelet coefficient x. Kn is an objective variable of this process, and is a K parameter to be used in Golomb-Rice coding when encoding the coefficient n for the next time. Kd is a K parameter used when performing Golomb-Rice coding on the wavelet coefficient d.

Figure 12:
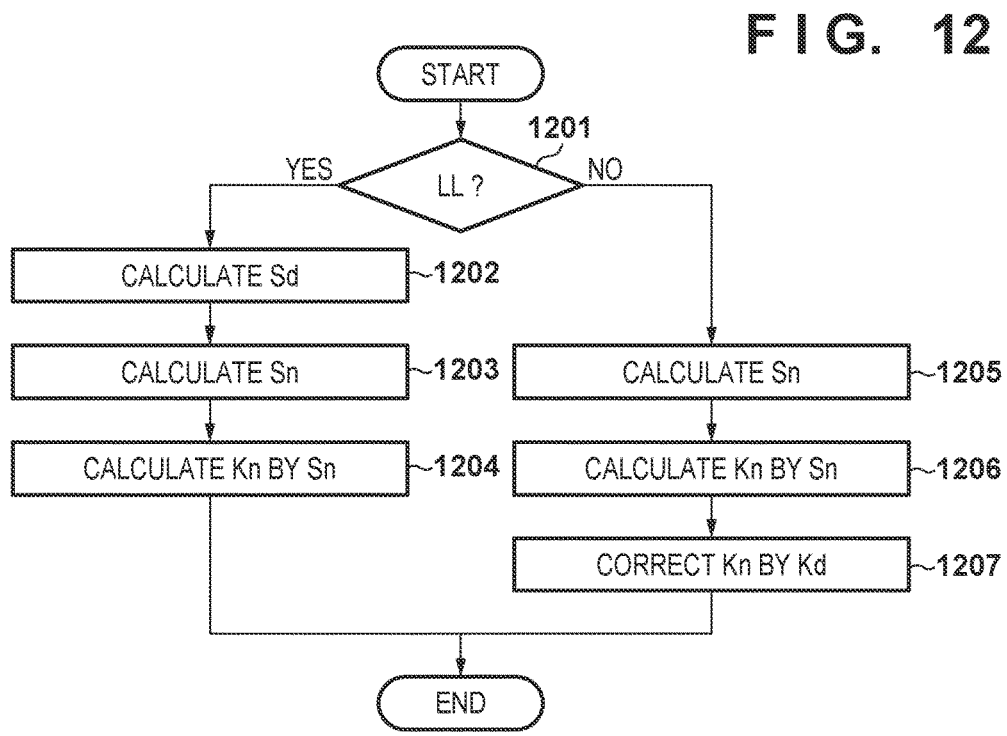
FIG. 12 is a flowchart showing details of a K parameter updating process of the first embodiment.

Based on the above description, a process of determining the K parameter Kn to be used in next encoding in the predictive encoder 203 when encoding of the coefficient x of interest is complete will be explained with reference to a flowchart shown in FIG. 12.

First, in step S1201, the predictive encoder 203 identifies, from the subband attribute information, whether the wavelet transform coefficient x of interest belongs to subband LL currently being encoded. If it is determined that a wavelet transform coefficient belonging to subband LL is currently being processed, the process advances to step S1202. If not, that is, if it is determined that subband LH, HL, or HH is currently being processed, the process advances to step S1205.

In step S1202, the predictive encoder 203 calculates the symbol Sd. The symbol Sd corresponds to the position of the already encoded wavelet transform coefficient d, and can also be implemented by holding the symbol itself of one line in a buffer. However, this increases the memory cost. Therefore, the predictive encoder 203 of this embodiment calculates the symbol Sd without buffering it. To calculate the symbol Sd, the predictive encoder 203 first obtains the predictive value p of the wavelet transform coefficient d. Since the subband as a processing target in step S1202 is LL, the original prediction method is MED as described earlier. However, if MED is performed at the position of the coefficient d, another one-line wavelet coefficient buffer is necessary. To prevent this, this embodiment obtains the predictive value p of the coefficient d in a pseudo manner by:

$$p=b$$

When the predictive value p of the wavelet transform coefficient d is obtained, the predictive encoder 203 obtains the symbol Sd by the same method as that of the predictive error-symbol generating process 604. When the symbol Sd is obtained, the process advances to step S1203.

In step S1203, the predictive encoder 203 predicts the symbol Sn (a symbol estimating process). In this stage, the coefficient n to be encoded next is unknown, but the symbol Sn corresponding to the unknown coefficient n is predicted as a mean value of the symbol Sx determined by latest encoding and the symbol Sd positioned above the symbol Sn. Accordingly, the predictive symbol Sn is obtained by:

$$Sn=(Sx+Sd)/2$$

When the predictive symbol Sn is thus obtained, the process advances to step S1204. In step S1204, the predictive encoder 203 calculates the K parameter "Kn" to be used in next encoding, based on the predictive symbol Sn.

In this embodiment, the K parameter "Kn" to be used in next encoding is determined in accordance with a code length derived when performing Golomb-Rice coding on the predictive symbol Sn by the K parameter "Kx" used when encoding the wavelet transform coefficient x. This process is the same as the method of literature 1. A practical example of step S1204 will be explained below.

As shown in FIG. 10B, a K parameter range within which the code length of a codeword obtained when performing Golomb-Rice coding on the symbol S is minimum exists. Let Kmin(S) be the lower limit of the K parameter range within which the minimum code length is obtained, and Kmax(S) be the upper limit thereof. For example, when the symbol S is "2" and the K parameter is 0 to 2, the codeword has a minimum code length of "3", so Kmin(2)=0, and Kmax(2)=2. Likewise, when the symbol S is "4", Kmin(4)=1, and Kmax(4)=3. These values of S, Kmin(S), and Kmax(S) are prepared as a table in a memory or the like.

As described above, the lower limit of the K parameter range within which the codeword corresponding to the predictive symbol Sn has a minimum code length can be represented by Kmin(Sn), and the upper limit thereof can be represented by Kmax(Sn).

(1) When Kx<Kmin(Sn)

The predictive encoder 203 estimates that if a symbol as a next encoding target is encoded by using Kx, it is highly likely that Kx becomes smaller than the lower limit of the range within which the minimum code length is obtained. Accordingly, the predictive encoder 203 obtains the K parameter "Kn" to be used in next encoding by increasing Kx by a predetermined value. More specifically, Kn is obtained by:

$$Kn=Kx+1$$

(2) When Kmin(Sn)≤Kx≤Kmax(Sn)

The predictive encoder 203 estimates that if a symbol as a next encoding target is encoded by using Kx, it is highly likely that Kx falls within the range within which the codeword has the minimum code length. Accordingly, the predictive encoder 203 determines that the K parameter "Kx" used when encoding the latest coefficient x can be used as the K parameter "Kn" to be used in next encoding.

(3) When Kmax(Sn)<Kx

The predictive encoder 203 estimates that if a symbol as a next encoding target is encoded by using Kx, it is highly likely that Kx becomes larger than the upper limit of the range within which the minimum code length is obtained. Accordingly, the predictive encoder 203 obtains the K parameter "Kn" to be used in next encoding by decreasing Kx by a predetermined value. More specifically, Kn is obtained by:

$$Kn=Kx-1$$

After determining Kn as described above, the predictive encoder 203 updates the K parameter buffer 607 so as to hold Kn as a K parameter to be used in next Golomb-Rice coding and delete an unnecessary K parameter, and terminates the process. As a consequence, the K parameter (above-mentioned Kn) held in the K parameter buffer 607 is used when encoding the next coefficient n.

On the other hand, if the wavelet transform coefficient x of interest belongs to subband LH, HL, or HH other than subband LL, the predictive encoder 203 advances the process to step S1205.

In step S1205, the predictive encoder 203 predicts the symbol Sn. Unlike step S1203, step S1205 is a step of predicting Sn of a subband (HL, LH, or HH) other than subband LL. Sd cannot be calculated in a subband other than subband LL. This is so because the wavelet coefficient information buffer 602 does not hold any buffer for a coefficient in the position of d in subbands LH and HH. Also, in subband HL, the prediction method is vertical, so another one-line wavelet coefficient buffer is required to calculate Sd. In this process, therefore, the predictive encoder 203 predicts the symbol Sn by:

$$Sn=Sx$$

That is, the predictive encoder 203 estimates that the symbol Sx when encoding the coefficient x of interest is equal to the symbol of the unknown wavelet transform coefficient n.

After obtaining the predictive symbol Sn, the predictive encoder 203 advances the process to step S1206. In step S1206, the predictive encoder 203 calculates Kn by the predictive symbol Sn. This process is the same as the method in step S1204 explained previously, so an explanation thereof will be omitted.

Then, in step S1207, the predictive encoder 203 corrects Kn by Kd. As described in the explanation of step S1205, Sn cannot be predicted by using Sd in subbands HL, LH, and HH unlike in subband LL. Accordingly, the accuracy of Kn is lower than that in subband LL. To compensate for this, this process corrects Kn by referring to Kd. In this embodiment, Kn is corrected based on:

$$Kn = \begin{cases} Kn+1 & \text{if } (Kd-Kn) > 1 \\ Kn & \text{otherwise} \end{cases}$$

After correcting Kn, the predictive encoder 203 updates the K parameter buffer 607 so as to hold Kn as a K parameter to be used in next Golomb-Rice coding and delete an unnecessary K parameter, and terminates the process.

The abovementioned processing makes it possible to determine Kn by referring not only to the latest encoding conditions (the symbol Sx and K parameter Kx) but also to the surrounding encoding condition (the symbol Sd or K parameter Kd) in the encoding process of any subband coefficient. Consequently, the encoding efficiency can be increased.

Referring to FIG. 6 again, the K parameter buffer 607 is a buffer for holding the K parameter to be used when encoding the next wavelet transform coefficient n, and holding the reference K parameter used in the K parameter updating process 606. Since the range of values which the K parameter can take is generally about 0 to 15, the bit range of the K parameter can be about four bits. Also, the number of K parameters to be held changes in accordance with a subband as described in the explanation of the K parameter updating process 606. FIG. 13 shows the positional relationship between the K parameter to be used in next encoding and the past K parameter to be used in the K parameter updating process of each subband, and the relationship between the numbers of K parameters to be held. In addition, this buffer is desirably implemented by a high-speed memory such as an SRAM because accesses frequently occur.

In the configuration as described above, the K parameter can be updated by using the K parameter buffer having a relatively narrow bit range, while suppressing the increase in wavelet coefficient buffer having a relatively wide bit range. This makes it possible to reduce the code amount when performing Golomb-Rice coding on a predictive error while suppressing the increase in memory cost.

[Second Embodiment]

In the aforementioned first embodiment, the predictive encoder 203 performs the prediction process 603 by switching the four types of prediction methods in accordance with each wavelet-transformed subband, thereby increasing the prediction accuracy. However, the process is complicated because the number of branches increases, and the wavelet coefficient buffer corresponding to the subband width of subband HL is necessary as shown in FIG. 9. When wavelet transform is performed a plurality of times, the size of subband LL decreases, and the sizes of other subbands increase. FIG. 7A shows an example in which wavelet transform is performed three times. Since subband LL exists in only decomposition level 3, so the subband width is ⅛ when compared to the width of an input image. By contrast, subband HL exists in each of decomposition levels 1 to 3, and the subband length is ⅛+²⁄₈+⁴⁄₈=⅞ when compared to the width of an input image. When wavelet transform is performed three times in the first embodiment, therefore, the number of wavelet coefficients to be buffered in subband HL is seven times that of subband LL. The second embodiment reduces the branches and also reduces the necessary buffers by simplifying this prediction process. A prediction process of the second embodiment will be explained below. Note that features other than the prediction process are the same as those of the first embodiment, and an explanation thereof will be omitted.

First, whether a wavelet transform coefficient currently being processed belongs to subband LL, HL, LH, or HH is identified from the subband attribute information in this prediction process of the second embodiment as well.

Then, if the subband currently being processed is LL, a predictive encoder 203 determines a predictive value p of a wavelet transform coefficient x by using MED (Median Edge Detection) prediction as in the first embodiment.

On the other hand, if the subband currently being processed is other than LL (one of subbands HL, LH, and HH), the predictive encoder 203 does not predict the wavelet transform coefficient x. That is, the predictive value p is as follows:

p=0

By the above processing, a predictive value corresponding to each subband can be output. FIG. 14 shows the relationship between reference coefficients to be used in the prediction process of each subband and the number of wavelet coefficients to be held to implement this reference. As shown in FIG. 14, the number of necessary wavelet coefficients reduces compared to that of the first embodiment, because no prediction is performed for subbands HL, LH, and HH in the second embodiment. In a K parameter updating process of the second embodiment, as in the first embodiment, the process branches in accordance with whether the wavelet coefficient currently being processed belongs to subband LL, thereby switching updating methods.

The above configuration can reduce the necessary buffers, and simplify the processing because subbands other than subband LL can be processed by the same prediction process and the same K parameter updating process.

[Third Embodiment]

In the abovementioned first embodiment, the methods of the k parameter updating process are switched in accordance with whether a wavelet transform coefficient currently being processed belongs to subband LL. This is so because subband LL holds wavelet transform coefficients of subband width+1 in the prediction process as shown in FIG. 9, and the symbol Sd shown in FIG. 11 can be calculated within this holding range. Accordingly, when a wavelet coefficient for generating the symbol Sd falls within the holding range for a reason other than the K parameter updating process, the K parameter buffer can be saved by using the symbol Sd. In this embodiment, predictive coding and runlength coding are switched based on the states of peripheral pixels as in JPEG-LS. By thus introducing runlength coding, the encoding efficiency further increases for an image in which the continuation of the same value frequently occurs.

Figure 15:
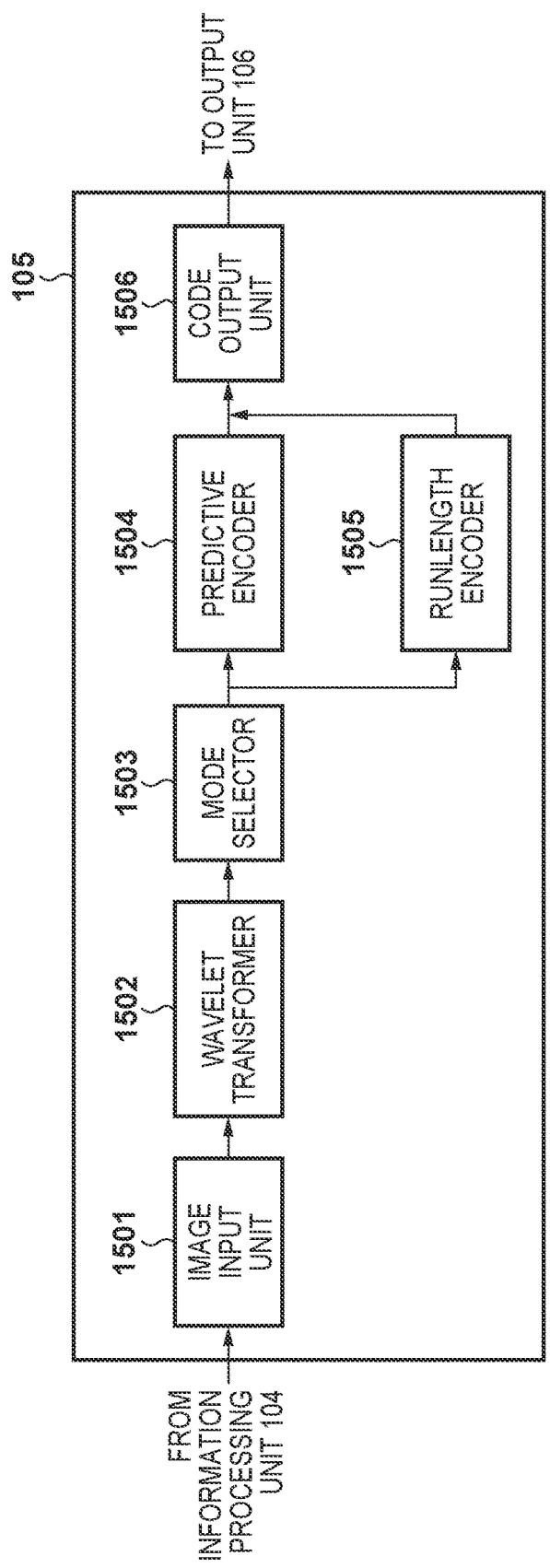
FIG. 15 is a view showing an example of the arrangement of an encoder of the third embodiment.

FIG. 15 shows the internal arrangement of an encoder 105 according to the third embodiment. The encoder 105 includes an image input unit 1501, wavelet transformer 1502, mode selector 1503, predictive encoder 1504, runlength encoder 1505, and code output unit 1506. The image input unit 1501 receives image data output from an image processing unit 104 for each color component. This can be the same as that of the first embodiment.

The wavelet transformer 1502 receives monochrome image data output from the image input unit 1501, and performs wavelet transform on the data. This can be the same as that of the first embodiment.

The mode selector 1503 performs mode determination which determines whether to execute a predictive encoding mode for a wavelet transform coefficient x of interest, or execute a runlength encoding mode starting from the wavelet transform coefficient x of interest, thereby performing an encoding mode selecting process. In the initial settings, runlength RL=0 is set. If the runlength RL is other than 0 or the states of surrounding coefficients satisfy the runlength encoding conditions, the mode selector 1503 sets the encoding mode to the runlength encoding mode, and causes the runlength encoder 1505 to perform encoding. If the above-mentioned conditions are not met, the mode selector 1503 selects the predictive encoding mode, and causes the predictive encoder 1504 to perform predictive encoding.

More specifically, as shown in FIG. 8, the left coefficient, upper left coefficient, upper coefficient, and upper right coefficient are respectively defined as a, c, b, and d with respect to the wavelet transform coefficient x of interest, and, if the following condition is met, the mode selector 1503 selects the runlength encoding mode. Then, the mode selector 1503 causes the runlength encoder 1505 to start runlength encoding.

Condition: "a=c and c=b and b=d"

If the mode selector 1503 selects the runlength encoding mode, the runlength encoder 1505 starts runlength encoding starting from the wavelet transform coefficient x of interest. In this case, the variable RL for counting runs is initialized to 0. Then, the runlength encoder 1505 sets the wavelet transform coefficient x of interest as a start point, and repeats a process of setting a right adjacent coefficient as a new coefficient x of interest by increasing the variable RL by 1 as long as the coefficient x is the same as the immediately preceding coefficient a. However, if the coefficient x of interest is different from the immediately preceding coefficient a, or if the coefficient x of interest is the same as the immediately preceding coefficient a and reaches the line terminal end (right end position), the runlength encoder 1505 outputs a codeword having the value (run) of the variable RL counted to that point, and notifies the mode selector 1503 of the end of runlength encoding. Upon receiving this notification, the mode selector 1503 switches the encoding mode to encoding by the predictive encoder 1504.

As described above, the coefficients a, b, c, and d around the wavelet transform coefficient x of interest are referred to in order to satisfy the condition for starting runlength encoding. When performing this process, therefore, a memory for holding wavelet coefficients of subband width+1 is necessary for each subband.

Note that the processing of the predictive encoder 1504 according to the third embodiment can be the same as that of the first embodiment except for the K parameter updating process. The K parameter updating process according to the third embodiment does not branch in accordance with whether a wavelet coefficient currently being processed belongs to subband LL as in the first embodiment, but branches in accordance with whether the coefficient belongs to subband HL. If a wavelet transform coefficient to be processed belongs to subband HL, the predictive encoder 1504 performs K parameter update using Kd. This K parameter update is the same as the process for subbands other than subband LL in the first embodiment. On the other hand, if the coefficient x of interest belongs to a subband other than subband HL, the predictive encoder 1504 performs K parameter update using the symbol Sd.

That is, if the coefficient x of interest belongs to subband LL, LH, or HH other than subband HL, the predictive encoder 1504 estimates the average value of a symbol corresponding to the coefficient x of interest and the symbol of the coefficient d as a tentative symbol for a succeeding coefficient. Also, if the coefficient x of interest belongs to subband HL and a parameter used when encoding the coefficient d is not larger by a predetermined value than a parameter used when encoding the coefficient x of interest, the predictive encoder 1504 estimates the parameter used when encoding the coefficient x of interest as a parameter to be used when encoding the succeeding coefficient n. If the coefficient x of interest belongs to subband HL and the parameter used when encoding the symbol of the coefficient d is larger by the predetermined value than the parameter used when encoding the coefficient x of interest, the predictive encoder 1504 estimates a value obtained by adding the predetermined value to the parameter used when encoding the coefficient x of interest as the parameter to be used when encoding the succeeding coefficient n.

The configuration as described above is adopted because wavelet coefficients of subband width+1 are held for all subbands. Therefore, the symbol Sd shown in FIG. 11 can be calculated within the wavelet coefficient holding range for subbands other than subband HL, so a K parameter buffer is unnecessary.

The processing of the runlength encoder 1505 is the same as that of JPEG-LS, so a detailed explanation thereof will be omitted. The code output unit 1506 combines the encoded data from the predictive encoder 1504 and runlength encoder 1505, and outputs the combined data to the output unit 106.

In the configuration as described above, the K parameter updating process can be performed while suppressing the increase in memory cost even in the encoding process in which runlength coding and predictive coding are introduced.

In the first embodiment, as shown in FIG. 2, the wavelet coefficient having undergone wavelet transform is directly supplied to the predictive encoder 203. Therefore, lossless coding can be implemented by using a 5/3 filter as a filter to be used in wavelet transform, but lossy coding may also be used by performing quantization in order to further increase the compression ratio. In this case, a wavelet coefficient having undergone wavelet transform is quantized, and the quantized coefficient is input to predictive coding.

It is also possible to switch predictive coding and runlength coding based on the states of surrounding pixels as in the third embodiment. It is effective to perform abovementioned quantization because a coefficient as an encoding target readily takes consecutive values.

Furthermore, in the first to third embodiments, if the wavelet coefficient for generating the symbol Sd falls outside the holding range, K parameter update using the K parameter buffer is performed instead. To further reduce the memory cost, the K parameter buffer is not used, and the process of step S1207 shown in FIG. 12 is not performed.

In addition, a camera is taken as an example of the apparatus incorporating the image encoding apparatus in each embodiment, but the camera is merely a typical example of the apparatus for encoding image data. An input source of image data as an encoding target is not limited to the imaging unit, and may also be a storage medium storing the image data as a file, so the input source is not particularly limited.

The encoded data generated by the image encoding apparatus described in the embodiment can be converted into an image data before encoding by using a conventional decoding method. In response to receiving the encoded data, a decoding apparatus performs prediction decoding, inverse quantizing, and inverse wavelet transforming to restore the image before encoding.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-092369, filed Apr. 28, 2015, which is hereby incorporated by reference wherein in its entirety.

What is claimed is:

1. An image encoding apparatus for encoding image data, the image encoding apparatus comprising:
 a memory storing instructions;
 a processor configured to implement the instructions stored in the memory and execute:
  a transforming task that performs wavelet transform on image data as an encoding target, and generate coefficients of a plurality of subbands; and
  a predictive encoding task that performs predictive coding on the coefficients in a raster scan order for each of the subbands obtained by the transforming task by performing:
   a symbol generating task that obtains a predictive value corresponding to a coefficient of interest in a subband of interest from a coefficient in a completely encoded position around the coefficient of interest, and generates a symbol as an encoding target from a predictive error as a difference between a value of the coefficient of interest and the predictive value;
   an encoding task that performs entropy coding on the generated symbol using a parameter determined in a process of encoding an immediately preceding coefficient of the coefficient of interest;
   an estimation task that estimates a tentative symbol corresponding to a succeeding coefficient to be encoded next to the coefficient of interest, based on a symbol corresponding to the coefficient of interest; and
   a determination task that determines a parameter for the succeeding coefficient from a code length obtained when assuming that the tentative symbol estimated by the estimation task is encoded by a parameter used when encoding the symbol of the coefficient of interest.

2. The apparatus according to claim 1, wherein the encoding task performs Golomb-Rice encoding, and the parameter is a K parameter to be used when performing the Golomb-Rice encoding.

3. The apparatus according to claim 1, wherein the estimation task:
  determines whether the coefficient of interest belongs to subband LL or one of subband HL, subband LH, or subband HH;
  estimates, when the coefficient of interest belongs to the subband LL, an average value of a symbol of the coefficient of interest and a symbol of a coefficient that exists on a line immediately preceding a line of interest on which the coefficient of interest is positioned and exists in the same position as that of the succeeding coefficient on the line of interest, as a tentative symbol for the succeeding coefficient; and
  estimates, when the coefficient of interest belongs to one of the subband HL, the subband LH, or the subband HH, the symbol of the coefficient of interest, as a tentative symbol for the succeeding coefficient.

4. The apparatus according to claim 3, wherein:
  when a coefficient that exists on a line immediately preceding a line of interest on which the succeeding coefficient is positioned and exists in the same position as that of the succeeding coefficient on the line of interest, is defined as a first coefficient,
  the estimation task calculates, when the coefficient of interest belongs to the subband LL, a symbol corresponding to the first coefficient by assuming that a predictive value of the first coefficient is a coefficient immediately preceding the first coefficient.

5. The apparatus according to claim 3, wherein the determination task corrects the estimated parameter by adding a predetermined value to the estimated parameter, when the coefficient of interest belongs to one of the subband HL, the subband LH, or the subband HH, and when a parameter obtained when encoding a symbol of a coefficient that exists on a line immediately preceding a line of interest on which the coefficient of interest is positioned and exists in the same position as that of the succeeding coefficient on the line of interest is larger by the predetermined value than the estimated parameter.

6. The apparatus according to claim 1, wherein the processor is configured to further execute:
  a runlength encoding task that counts runs when a coefficient of interest is the same as an immediately preceding coefficient, and outputs a codeword of the counted runs when the coefficient of interest and the immediately preceding coefficient are different or the coefficient of interest reaches a line terminal end; and
  a mode determination task that determines, from a plurality of coefficients in already encoded positions around the coefficient of interest, whether to encode the coefficient of interest by the predictive encoding task or encode the coefficient of interest by the runlength encoding task using the coefficient of interest as a start point of a run,
  wherein the estimation task:
    determines whether the coefficient of interest belongs to subband HL or one of subband LL, subband LH, or subband HH;
    estimates, when the coefficient of interest belongs to one of the subband LL, the subband LH, the subband HH, an average value of a symbol corresponding to the coefficient of interest and a symbol of a coefficient that is positioned on a line immediately preceding a line of interest on which the succeeding coefficient is positioned and exists in the same position as that of the succeeding position on the line of interest, as a tentative symbol for the succeeding coefficient;
    estimates a parameter used when encoding the coefficient of interest as a parameter to be used when encoding the succeeding coefficient, when the coefficient of interest belongs to subband HL, and when a parameter used when encoding a symbol of a coefficient that is positioned on a line immediately preceding a line of interest on which the succeeding coefficient is positioned and exists in the same position as that of the succeeding coefficient on the line of interest is not larger by a predetermined value than the parameter used when encoding the coefficient of interest; and
    estimates a value obtained by adding a predetermined value to a parameter used when encoding the coefficient of interest as a parameter to be used when encoding the succeeding coefficient, when the coefficient of interest belongs to the subband HL, and when a parameter used when encoding a symbol of a coefficient that is positioned on a line immediately preceding a line of interest on which the succeeding coefficient is positioned and exists in the same position as that of the succeeding coefficient on the line of interest is larger by the predetermined value than the parameter used when encoding the coefficient of interest.

7. The apparatus according to claim 6, wherein encoded data is data encoded by JPEG-LS.

8. The apparatus according to claim 1, wherein the symbol generating task:
  obtains a predictive value of the coefficient of interest using MED (Median Edge Detection) prediction, when a subband of interest currently being processed is subband LL;
  sets a coefficient that exists on a line immediately preceding a line of interest on which the coefficient of interest is positioned and exists in the same position as that of the coefficient of interest on the line of interest, as a predictive value of the coefficient of interest, when a subband currently being processed is subband HL;
  sets a coefficient encoded immediately before the coefficient of interest as a predictive value, when a subband currently being processed is subband LH; and
  sets a fixed value as a predictive value of the coefficient of interest, when a subband currently being processed is subband HH.

9. The apparatus according to claim 1, further comprising:
  a first buffer configured to hold a wavelet coefficient; and
  a second buffer configured to hold a K parameter.

10. A non-transitory computer-readable storage medium storing a computer program executable by a computer to execute a method comprising the steps of:
  performing wavelet transform on image data as an encoding target and generating coefficients of a plurality of subbands; and
  performing predictive coding on the coefficients in a raster scan order for each of the subbands obtained in the transform step,
  wherein the predictive coding step includes the steps of;
    obtaining a predictive value corresponding to a coefficient of interest in a subband of interest from a coefficient in a completely encoded position around the coefficient of interest, and generating a symbol as an encoding target from a predictive error as a difference between a value of the coefficient of interest and the predictive value;

performing entropy coding on the generated symbol using a parameter determined in a process of encoding an immediately preceding coefficient of the coefficient of interest;

estimating a tentative symbol corresponding to a succeeding coefficient to be encoded next to the coefficient of interest based on a symbol corresponding to the coefficient of interest; and determining a parameter for the succeeding coefficient from a code length obtained when assuming that the tentative symbol estimated in the estimating step is encoded by a parameter used when encoding the symbol of the coefficient of interest.

11. A control method of an image encoding apparatus for encoding image data, the control method comprising the steps of:

performing wavelet transform on image data as an encoding target and generating coefficients of a plurality of subbands; and performing predictive coding on the coefficients in a raster scan order for each of the subbands obtained the transform step, wherein in the predictive coding step includes the steps of:

obtaining a predictive value corresponding to a coefficient of interest in a subband of interest from a coefficient in a completely encoded position around the coefficient of interest, and generating a symbol as an encoding target from a predictive error as a difference between a value of the coefficient of interest and the predictive value;

performing entropy coding on the generated symbol using a parameter determined in a process of encoding an immediately preceding coefficient of the coefficient of interest;

estimating a tentative symbol corresponding to a succeeding coefficient to be encoded next to the coefficient of interest based on a symbol corresponding to the coefficient of interest; and determining a parameter for the succeeding coefficient from a code length obtained when assuming that the tentative symbol estimated in the estimating step is encoded by a parameter used when encoding the symbol of the coefficient of interest.

* * * * *